United States Patent
Plante et al.

(10) Patent No.: US 11,499,594 B2
(45) Date of Patent: Nov. 15, 2022

(54) MAGNETORHEOLOGICAL FLUID CLUTCH APPARATUS WITH LOW PERMEABILITY DRUMS

(71) Applicant: EXONETIK INC., Sherbrooke (CA)

(72) Inventors: Jean-Sebastien Plante, Sherbrooke (CA); Jérôme Marchand, Sherbrooke (CA); Pascal Larose, Sherbrooke (CA); Patrick Chouinard, Sherbrooke (CA); Marc Denninger, Sherbrooke (CA); Jean-Philippe Lucking Bigue, Sherbrooke (CA)

(73) Assignee: EXONETIK INC., Sherbrooke (CA)

(*) Notice: Subject to any disclaimer, the term of this patent is extended or adjusted under 35 U.S.C. 154(b) by 0 days.

(21) Appl. No.: 17/284,601

(22) PCT Filed: Oct. 11, 2019

(86) PCT No.: PCT/CA2019/051451
§ 371 (c)(1),
(2) Date: Apr. 12, 2021

(87) PCT Pub. No.: WO2020/073134
PCT Pub. Date: Apr. 16, 2020

(65) Prior Publication Data
US 2021/0317883 A1      Oct. 14, 2021

Related U.S. Application Data

(60) Provisional application No. 62/744,976, filed on Oct. 12, 2018.

(51) Int. Cl.
*F16D 37/02*      (2006.01)
*F16D 37/00*      (2006.01)

(52) U.S. Cl.
CPC ........ *F16D 37/02* (2013.01); *F16D 2037/007* (2013.01); *F16D 2200/003* (2013.01)

(58) Field of Classification Search
CPC ................................................. F16D 37/00–02
See application file for complete search history.

(56) References Cited

U.S. PATENT DOCUMENTS 3,351,166 A * 11/1967 Potter ..................... F16D 37/02
                                                             192/21.5
5,090,531 A *  2/1992 Carlson ................ H02K 49/104
                                                             74/650

(Continued)

FOREIGN PATENT DOCUMENTS

WO       2015113165 A1      8/2015
WO       2016168934 A1     10/2016

*Primary Examiner* — David R Morris
(74) *Attorney, Agent, or Firm* — Norton Rose Fulbright Canada LLP

(57) ABSTRACT

A magnetorheological fluid clutch apparatus comprises an input(s) having an input shear surface(s). An output(s) is rotatably mounted about the input for rotating about a common axis with the input, the output(s) having output shear surface(s), the input shear surface and the output shear surface separated annular space(s), with magnetorheological fluid, configured to generate a variable amount of torque transmission between the sets of input rotor and output rotor when subjected to a magnetic field. An electromagnet(s) delivers a magnetic field through the magnetorheological fluid, the electromagnet configured to vary the strength of the magnetic field, whereby actuation of the electromagnet results in torque transmission from the input to the output. A member(s) defining at least one of the shear surfaces is made of a low-permeability material.

21 Claims, 4 Drawing Sheets

(56) References Cited

U.S. PATENT DOCUMENTS

| | | | |
|---|---|---|---|
| 5,823,309 A * | 10/1998 | Gopalswamy | F16D 37/02 |
| | | | 192/21.5 |
| 6,543,396 B2 | 4/2003 | Stretch et al. | |
| 7,422,093 B2 | 9/2008 | Murty et al. | |
| 8,100,238 B2 | 1/2012 | Steinwender | |
| 8,157,689 B2 | 4/2012 | Steinwender et al. | |
| 8,215,467 B2 * | 7/2012 | Smith | F16D 37/02 |
| | | | 188/267.2 |
| 8,960,397 B2 | 2/2015 | Maas et al. | |
| 2003/0111312 A1 | 6/2003 | Stretch | |
| 2007/0023247 A1 * | 2/2007 | Ulicny | F16D 37/02 |
| | | | 192/21.5 |
| 2009/0026033 A1 | 1/2009 | Steinwender et al. | |
| 2010/0096233 A1 * | 4/2010 | Smith | F16D 37/02 |
| | | | 180/367 |
| 2012/0085613 A1 | 4/2012 | Böse et al. | |

* cited by examiner

MAGNETORHEOLOGICAL FLUID CLUTCH APPARATUS WITH LOW PERMEABILITY DRUMS

TECHNICAL FIELD

This invention relates generally to magnetorheological (MR) fluid clutch apparatuses, and more particularly, to configurations of such apparatus for various applications.

BACKGROUND

Magnetorheological (MR) fluid clutch apparatuses are used for transmitting motion/forces from a drive shaft with precision and accuracy, among other advantages. Accordingly, an increasing number of applications consider the use of MR fluid clutch apparatuses. In a common configuration, the MR fluid clutch apparatus has drums on both the input and the output, with MR fluid located in the annular gaps between the shear surfaces of drums of the input and output. To magnetize the MR fluid located in the annular gaps, a magnetic field passes through the drums, which are known to use materials with high permeability. Steel, for example, is commonly used as material for the drums of MR fluid clutch apparatuses.

There are fabrication constraints associated with steel drums, notably in terms of thickness in relation to cost. As such, drums of high permeability are relatively thick. The thickness of the drum walls results in non-negligible weight considering the mass of steel alloys. As a further consequence of the weight, inertia and momentum of high permeability materials may impact the bandwidth or natural frequency of MR fluid clutch apparatuses. In some of the application where high bandwidth is required, like in collaborative robotics where a robot needs to quickly react to human contact in order to be safe, the drum configuration of prior art MR fluid clutch apparatuses may hamper their performance.

SUMMARY

It is an aim of the present disclosure to provide magnetorheological (MR) fluid clutch apparatuses that addresses issues associated with the prior art.

Therefore, in accordance with a first embodiment of the present disclosure, there is provided a magnetorheological fluid clutch apparatus comprising: at least one input adapted to be coupled to a torque input, the input having at least one input shear surface; an output rotatably mounted about the input for rotating about a common axis with the input, the output having at least one output shear surface, the input shear surface and the output shear surface separated by at least one annular space; magnetorheological fluid in the at least one annular space, the magnetorheological fluid configured to generate a variable amount of torque transmission between the input rotor and output rotor when subjected to a magnetic field; and at least one electromagnet configured to deliver a magnetic field through the magnetorheological fluid, the electromagnet configured to vary the strength of the magnetic field; whereby actuation of the electromagnet results in torque transmission from the input to the output, wherein at least one member defining the at least one of the shear surfaces is made of a low-permeability material.

Further in accordance with the first embodiment, for example, the at least one output shear surface includes at least one output drum made with the low-permeability material.

Still further in accordance with the first embodiment, for example, the at least output drum has a thickness ranging 0.05 mm and 1.00 mm, inclusively.

Still further in accordance with the first embodiment, for example, a plurality of the output drum may be in a concentric arrangement about the common axis.

Still further in accordance with the first embodiment, for example, the output drums are defined by concentric tubular body portions connected to a common radial wall.

Still further in accordance with the first embodiment, for example, the common radial wall is made from a low-permeability material.

Still further in accordance with the first embodiment, for example, the concentric tubular body portions and the radial wall are a monolithic piece.

Still further in accordance with the first embodiment, for example, the output drums are cups inserted in one another.

Still further in accordance with the first embodiment, for example, the at least one output drum is cylindrical.

Still further in accordance with the first embodiment, for example, the at least one input shear surface includes at least one input drum made with the low-permeability material.

Still further in accordance with the first embodiment, for example, the at least one input drum has a thickness ranging 0.05 mm and 1.00 mm, inclusively.

Still further in accordance with the first embodiment, for example, a plurality of the input drum may be in a concentric arrangement about the common axis.

Still further in accordance with the first embodiment, for example, the input drums are defined by concentric tubular body portions connected to a common radial wall.

Still further in accordance with the first embodiment, for example, the common radial wall is made from a low-permeability material.

Still further in accordance with the first embodiment, for example, the concentric tubular body portions and the radial wall are a monolithic piece.

Still further in accordance with the first embodiment, for example, the input drums are cups inserted in one another.

Still further in accordance with the first embodiment, for example, the annular space between the input shear surface and the output shear surface shear has a width of 0.25 mm +/−0.05 mm.

Still further in accordance with the first embodiment, for example, the low-permeability material is a plastic or aluminum.

Still further in accordance with the first embodiment, for example, the plastic or aluminum is doped with metallic particles.

Still further in accordance with the first embodiment, for example, the low-permeability material has a permeability of at most $1.0 \times 10^{-4}$ H/m.

Still further in accordance with the first embodiment, for example, the input is rotatable.

Still further in accordance with the first embodiment, for example, the input is static, and the torque input is a brake torque.

In accordance with a second embodiment of the present disclosure, there is provided a magnetorheological fluid clutch apparatus comprising: at least one input adapted to be coupled to a torque input, the input having at least one input shear surface; an output rotatably mounted about the input for rotating about a common axis with the input, the output having at least one output shear surface, the input shear surface and the output shear surface separated by at least one annular space; magnetorheological fluid in the at least one annular space, the magnetorheological fluid configured to generate a variable amount of torque transmission between the input rotor and output rotor when subjected to a magnetic field; and at least one electromagnet configured to deliver a magnetic field through the magnetorheological fluid, the electromagnet configured to vary the strength of the magnetic field; whereby actuation of the electromagnet results in torque transmission from the input to the output, wherein at least one member defining the at least one of the shear surfaces is made of a plastic or of an aluminum.

DETAILED DESCRIPTION OF THE DRAWINGS

Figure 1:
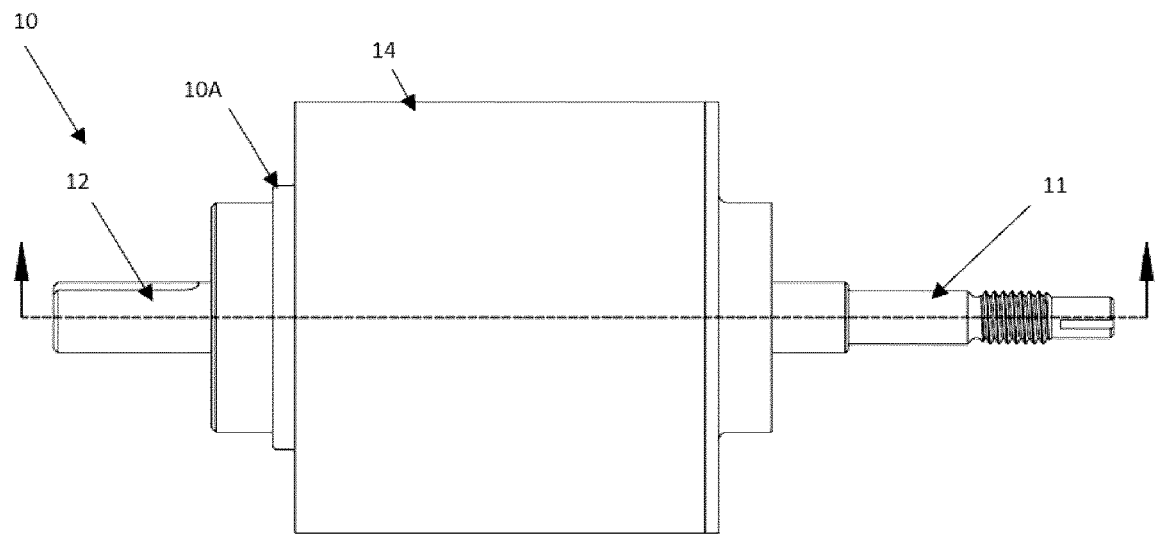
FIG. 1 is an exemplary schematic view of a magnetorheological (MR) fluid clutch apparatus in accordance with the present disclosure.
Figure 7:
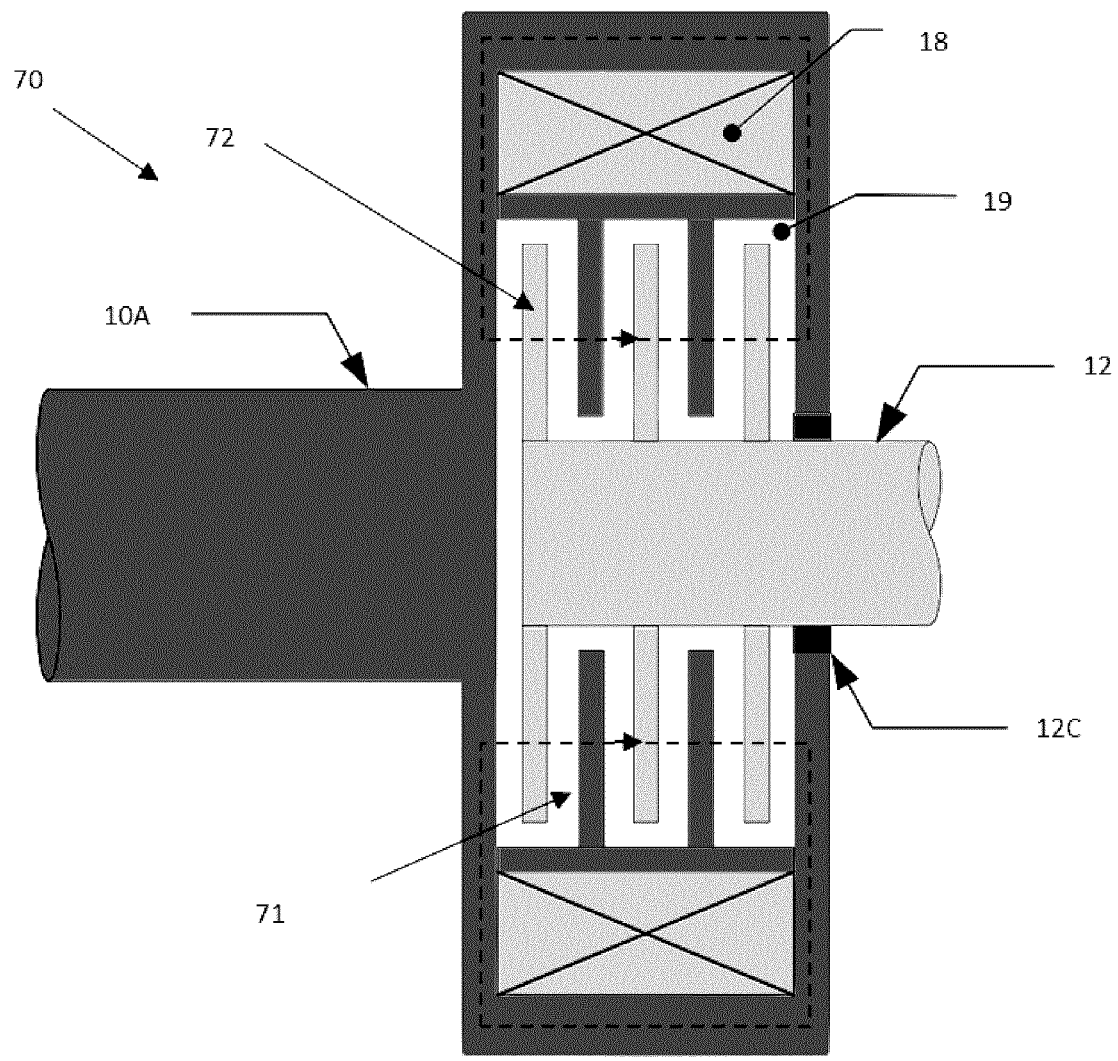
FIG. 7 a sectioned schematic view of the MR fluid brake apparatus that is using discs instead of drums.

Referring to the drawings and more particularly to FIG. 1, there is illustrated a magnetorheological (MR) fluid clutch apparatus 10 configured to provide a mechanical output force based on a received input current. The MR fluid clutch apparatus 10 is shown as being of the type having collinear input and output shafts, 12 and 11, respectively, with the rotational axis shown as CL, as an illustrative example. The concepts described herein may apply to other configurations of MR fluid clutch apparatuses 10, for instance some with an input or output outer shell/casing for an output or input shaft, others with input and output shells, etc. The principles illustrated here will be explained with reference to a MR fluid clutch apparatus having drums but could also be applied to a plate type MR fluid clutch apparatus, i.e., a MR fluid clutch apparatus have disk(s) with the radial surfaces of the disk(s) being the main shear surfaces for torque transmission. Such a MR fluid clutch apparatus is shown in FIG. 7.

The MR fluid clutch apparatus 10 may provide an output force in response to an input current received from a controller, to transmit an input force. The exemplary MR fluid clutch apparatus 10 of FIGS. 1 and 2 may have a stator 10A by which the MR fluid clutch apparatus 10 is connected to a structure, in accordance with an embodiment. The fixed stator 10A may allow the MR fluid clutch apparatus 10 to provide a multiturn output (i.e., the output may rotate about more than 360 degrees relative to axis X). In some applications where multiturn is not required, a stator may not be present in the MR fluid clutch apparatus 10. The MR fluid clutch apparatus 10 features driven member 11 (shown via its shaft 11) and driving member 12 (also shown via its shaft 12) separated by gaps filled with an MR fluid, as explained hereinafter. The driving member 12 may receive rotational energy (torque) from a power device, such as a motor or like source of torque, with or without a transmission, such as a reduction gear box, a belt, etc.

Figure 2:
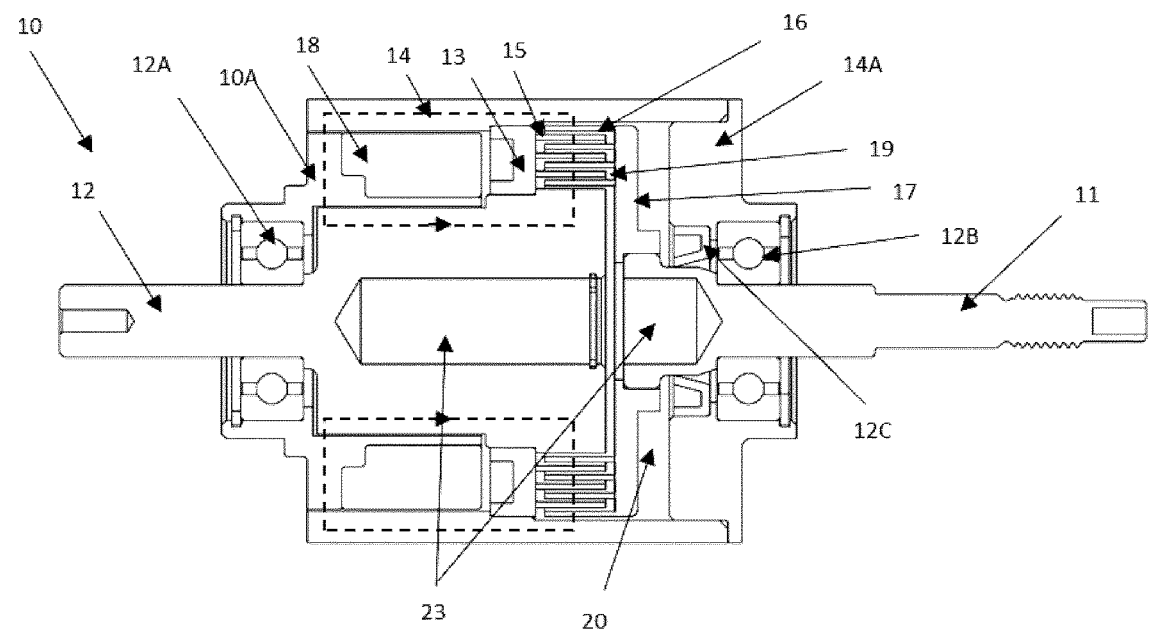
FIG. 2 is a sectioned schematic view of the MR fluid clutch apparatus of FIG. 1, in accordance with an embodiment.
Figure 3:
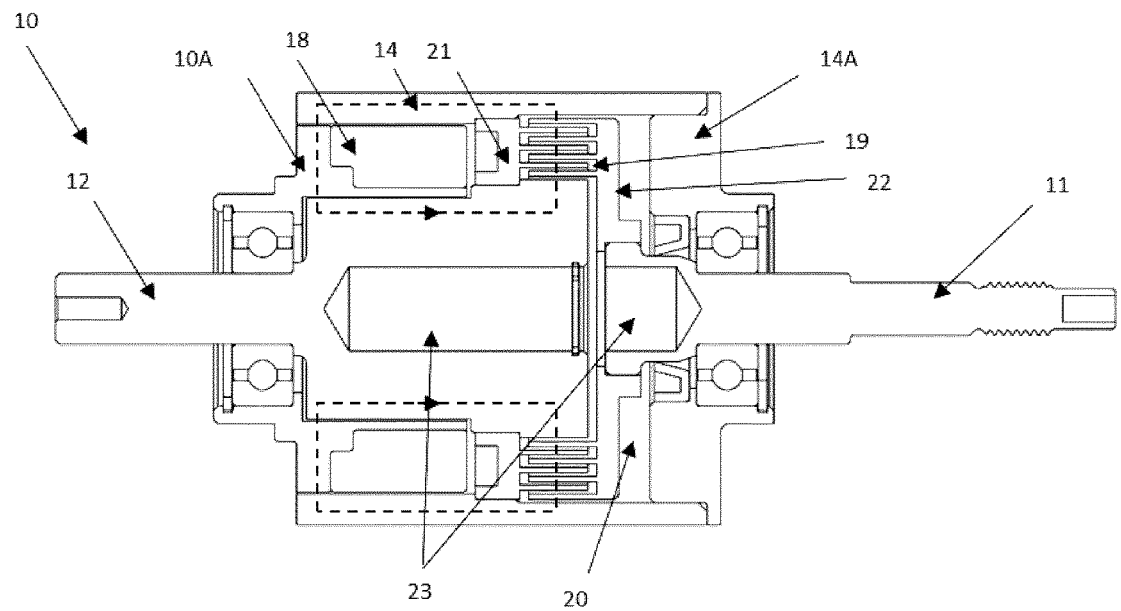
FIG. 3 is a sectioned schematic view of the MR fluid clutch apparatus of FIG. 1, in accordance with another embodiment.
Figure 4:
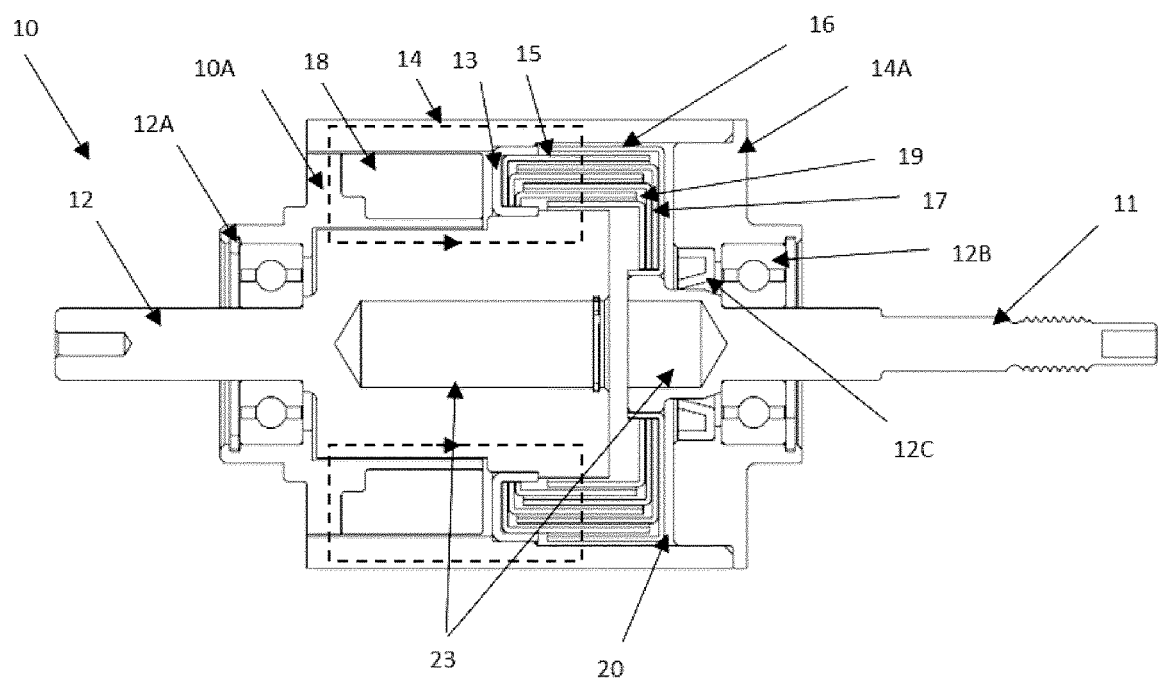
FIG. 4 is a sectioned schematic view of the MR fluid clutch apparatus of FIG. 1, in accordance with yet another embodiment.

According to an embodiment, the driving member 12 may be in mechanical communication with a power input, and driven member 11 may be in mechanical communication with a power output (i.e., force output, torque output). As shown in FIGS. 2-4, the stator 10A, the driven member 11 and the driving member 12 may be interconnected by bearings 12A and 12B. Two bearings are shown, but more may be present. Moreover, as mentioned above, the MR fluid clutch apparatus 10 may be without a stator, with the driven member 11 and the driving member 12 being directly rotatably connected to one another, and with either one or both being mounted to a structure or the like. In the illustrated embodiment, the bearing 12A is between the stator 10A and the driving member 12, whereas the bearing 12B is between the driven member 11 and the driving member 12. Seals 12C, such as cup seals (shown, O-rings, etc.), may also be provided at the interface between the driven member 11 and the driving member 12 and/or stator 10A, to preserve MR fluid between the members 11 and 12. Moreover, the seals are provided to block MR fluid from reaching the bearing 12B or to leak out of the apparatus 10.

As shown with reference to FIGS. 2-4 below, drums are located circumferentially about the rotational axis CL. Drums may be defined as having a tubular body portion surrounding the rotational axis CL. The tubular body portion of a drum is shown as being cylindrical, but may have other shapes, such as frusto-conical. Some support must therefore extend generally radially to support the tubular body portion of the drums in their circumferential arrangement. In accordance with one embodiment, referring to FIG. 2, a low permeability input drum support 13 (a.k.a., a radial wall or disk/disc) projects radially from a shaft of the driving member 12. The input drum support 13 may be connected to an input rotor 14 defining the outer casing or shell of the MR fluid clutch apparatus 10. The input rotor 14 may therefore be rotatably connected to the driven member 11 by the bearing 12B. In an embodiment, the input rotor 14 has an input rotor support 14A which forms a housing for the bearing 12B. According to an embodiment, the input rotor support 14A is an integral part of the input rotor 14, and may be fabricated as a single piece. However, this is not necessary as the input rotor support 14A may be made from a low permeability material and the input rotor 14 may be made from a high permeability material, as a possibility among others. As another embodiment, as shown in FIG. 2, the input rotor support 14A may be defined by an annular wall fabricated separately from a remainder of the input rotor 14, though both are interconnected in any appropriate way for concurrent rotation. Therefore, in the illustrated embodiment, the shaft of the driving member 12, the input drum support 13 and the input rotor 14 rotate concurrently. In an embodiment, it is contemplated to have the outer shell of the MR fluid clutch apparatus 10 be part of the stator 10A, or of the driven member 11.

The input drum support 13 may support one or more concentric annular drums 15, also known as input annular drums. The input annular drums 15 are secured to the input drum support 13, being common to the annular drums 15. In an embodiment, concentric annular channels are defined (e.g., machined, cast, molded, etc.) in the input drum support 13 for insertion therein of the drums 15. A tight fit (e.g., force fit), an adhesive and/or radial pins are among the numerous solutions that may be used to secure the drums 15 to the input drum support 13. In an embodiment, the input drum support 13 is fixed to the shaft of the driving member 12

(e.g., monolithic construction, welded, spline, etc.), whereby the various components of the driving member 12 rotate concurrently when receiving the drive from the power source.

The driven member 11 is represented by the output shaft, configured to rotate about axis CL as well. The output shaft may be coupled to various mechanical components that receive the transmitted power output when the MR fluid clutch apparatus 10 is actuated to transmit at least some of the rotational power input from the driving member 12.

The driven member 11 also has one or more concentric annular drums 16, also known as output drums, mounted to an output drum support 17. The output drum support 17 may be an integral part of the output shaft, or may be mounted thereon for concurrent rotation. The annular drums 16 are spaced apart in such a way that the sets of output annular drums 16 fit within the annular spaces between the input annular drums 15, in intertwined fashion. When either of both the driven member 11 and the driving member 12 rotate, there may be no direct contact between the annular drums 15 and 16, due to the concentricity of the annular drums 15 and 16, about axis CL.

In the embodiment of FIG. 2, the input drums 15 may consist of a heavy high-permeability material (e.g., steel) or a light low-permeability material (e.g., plastic, plastic doped with metallic particle or aluminum)—permeability herein being magnetic permeability, for instance in H/m or N/A$^2$. Low permeability can be defined as being at or below $1.0 \times 10^{-4}$ H/m, i.e., at most $1.0 \times 10^{-4}$ H/m. The output drums 16 may be made of a low-permeability material (e.g., plastic, plastic doped with metallic particles or aluminum). The plastic may be a polymer capable of withstanding the relatively high temperatures of operation in a MR fluid with friction. For instance, examples of polymers that may be used include polyetheretherketone (PEEK), or polyamide. Drums 15 and/or 16 being in the low-permeability material may be relatively thin, with a thickness ranging between 0.05 mm and 1.00 mm, inclusively.

According to an embodiment, the annular spaces have a width of 0.25 mm +/−0.05 mm, between the facing surfaces of sets of drums 15 and 16, i.e., in the radial direction. These surfaces may be known as the shear surfaces. The width range of the annular spaces is provided only as a non-exclusive example, as other annular space widths are considered as well, taking into account various factors such as overall torque, part sizes, viscous drag, etc.

An electromagnet unit 18 may be supported by the stator 10A in the embodiment with the stator 10A. The electromagnet unit 18 is used to activate and control the clutch function of the MR fluid clutch apparatus 10. The electromagnetic unit 18 is shown schematically, but conventionally may have an annular coil and a core forming an electromagnet, and/or a permanent magnet, and all necessary wiring to create a variable magnetic field.

The annular spaces between the annular drums 15 of the driving member 12, and the annular drums 16 of the driven member 11 are filled with the MR fluid 19. The MR fluid 19 used to transmit force between the driven member 11 and the driving member 12 is a type of smart fluid that is composed of magnetisable particles disposed in a carrier fluid, usually a type of oil. When subjected to a magnetic field, the fluid may increase its apparent viscosity, potentially to the point of becoming a viscoplastic solid. The apparent viscosity is defined by the ratio between the operating shear stress and the operating shear rate of the MR fluid comprised between opposite shear surfaces. The magnetic field intensity mainly affects the yield shear stress of the MR fluid. The yield shear stress of the fluid when in its active ("on") state may be controlled by varying the magnetic field intensity produced by electromagnets and/or permanent magnets, i.e., the input current, via the use of a controller. Accordingly, the MR fluid's ability to transmit force can be controlled with the electromagnet unit 18, thereby acting as a clutch between the members 11 and 12. The electromagnet unit 18 is configured to vary the strength of the magnetic field via a controller such that the friction between the members 11 and 12 is low enough to allow the driving member 11 to freely rotate relative to the driven member 12 and vice versa. Consequently, the MR fluid clutch apparatus 10 may vary the amount of force provided in response to a received input by changing the amount of magnetic flux to which is exposed the MR fluid. In particular, the MR fluid clutch apparatus 10 may provide an output force based on the input force by changing the amount of magnetic flux based on the input force.

The annular spaces between each set of drum 15 and 16 are part of a MR fluid chamber sealed off by a seal or seals. The MR fluid chamber include the annular spaces between the set of drums 15 and 16, and may include space at the end of drum tips, and space between the drums 15 and 16 and shear surfaces that are part of the shaft of the driving member 12 and input rotor 14. The MR fluid chamber may also include the annular space 20, located opposite the output drum support 17. According to an embodiment, a flow of the MR fluid is as follows. When the driving member 12 rotates, some pumping action may be created by the input drums 15, by which the MR fluid 19 moves in a radial outward direction after reaching ends of drums 15 and 16. Upon going beyond the outermost drum 16, the MR fluid 19 may be directed to pass the radial edge of the output drum support 17 and into the annular space 20. The MR fluid 19 will move radially inward, to return to the other side of the output drum support 17 to cycle between the drums 15 and 16, via holes in the output drum support 17.

The movement of the MR fluid in the manner described above allows the MR fluid to cycle in the MR fluid chamber. The movement may be achieved via the presence of helical channels on the surface of the drums 15. Other surface depressions or local variations of permeability could also be used on either one of the drum sets 15 or 16 to induce a pumping action in the MR fluid chamber, i.e., some form of cavity, protrusion or channel in an otherwise smooth cylindrical surface.

In the embodiment of FIG. 3, the MR fluid clutch apparatus 10 is similar to the one of FIG. 2, whereby like reference numerals represent like elements. In the embodiment of FIG. 3, as shown as assembly 21, the input drum support 13 and the input drum(s) 15 are one integral piece, such as a monolithic piece. As shown as assembly 22, the output drum(s) 16 and output drum supports 17 may also be made of one integral piece, such as a monolithic piece. For example, the assembly 21 of input drum support 13 and input drum(s) 15 may consist of a relatively heavy high-permeability material (e.g., steel) or a light low-permeability material (e.g., plastic, plastic doped with metallic particle or aluminum). The assembly 22 is made of a low-permeability material (e.g., plastic, plastic doped with metallic particle, aluminum or aluminum doped with metallic particle, among other possibilities). In accordance with an embodiment, the assembly 21 and/or the assembly 22 is(are) integrally molded into a single piece(s). For example, the assembly 21 and/or 22 may be injection-molded from plastic.

In the embodiment of FIG. 4, the MR fluid clutch apparatus 10 is similar to the one of FIG. 2, whereby like reference numerals represent like elements. In FIG. 4, the input drums 15 and/or the output drums 16 are stamped in a light low-permeability material (e.g., plastic, plastic doped with metallic particle, aluminum or aluminum doped with metallic particle, among other possibilities). In the embodiment of FIG. 4, the input drums 15 and/or the output drums 16 may be regarded as a plurality of cylindrical cups inserted into one another, from larger to smaller. This is shown for example in greater detail in FIG. 6, with lines of annularity removed to emphasize the cups. Such lines are present in FIG. 4 as vertical lines at the open end of cups.

Figure 6:
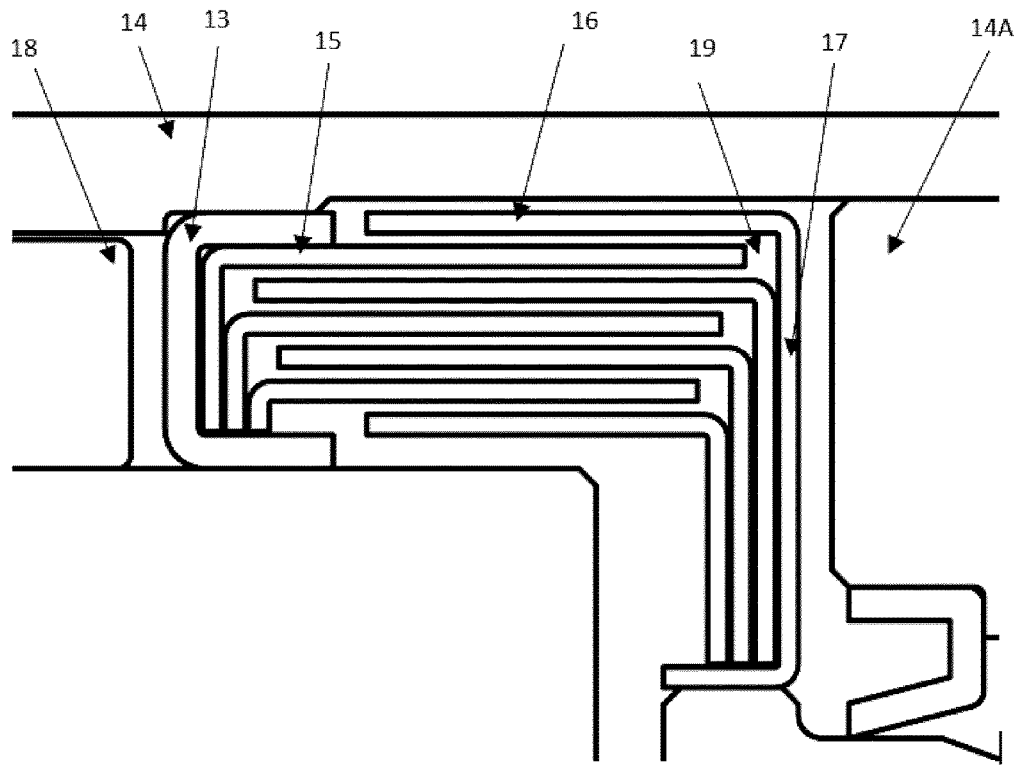
FIG. 6 is a close-up view of the drawn cups arrangement of MR fluid clutch apparatus of FIG. 4.

FIG. 6 is a close-up view of the input drums 15 and/or the output drums 16 of MR fluid clutch apparatus 10 of FIG. 4. The close-up shows the plurality of cylindrical cups inserted into one another, from larger to smaller. The cups may be attached one to another by any appropriate way, including spot welding, bonding, press-fit or any other type of mechanical attachment method.

In one or more of the embodiments of FIGS. 2 to 4, the space 20, if present, may be in fluid communication with an expansion system 23. The expansion system 23 may be in a cavity inside shafts of the driven member 11 and driving member 12 and the cavity may be filled with a compliant material, like closed cell neoprene, or a diaphragm or like compliant membrane. This is one example among others of MR fluid circulation.

In one or more of the embodiments of FIGS. 2 to 4, when a current passes through the annular coil, a magnetic field is produced in the core of the electromagnetic unit 18 and through the intertwined arrangement of drums 15 and 16 and shear surfaces of the shaft 12 and input rotor 14, with MR fluid 19 therebetween. The magnetic field therefore increase the apparent viscosity of the MR fluid 19, to seize the drums 15 and 16, to cause a transmission of the rotational motion from the input drums 15 to the output drums 16. The intertwined arrangement of drums 15 and 16, allows the increase of the total clutch contact surface and of the clutch contact surface per volume of MR fluid 19. In another embodiment, the electromagnetic unit 18 is used to reduce a magnetic field on the arrangement of drums 15 and 16, as caused by a permanent magnet. This is for instance as described in PCT Patent Application Publication No. WO2016/168934, entitled Magnetorheological Fluid Clutch Apparatus with Cylindrical Air Gap, incorporated herein by reference.

In one possible configuration, during operation, a power source (not shown) causes the driving member 12 to rotate. MR fluid 19 transmits at least some rotational energy (torque) to the driven member 11 by the application of a magnetic field by the electromagnet unit 18, thereby causing driven member 11 to rotate. The electromagnet unit 18 subjects MR fluid 19 to a magnetic field that, if varied, may change the apparent viscosity of MR fluid 19. Changing the apparent viscosity of MR fluid 19, in turn, may change the amount of rotational energy transferred from driving member 12 to driven member 11. Accordingly, in the example of the MR fluid clutch apparatus 10, the amount of rotational energy transferred to driven member 11 may be regulated by controlling the amount of magnetic field generated by the electromagnet unit 18, for instance via a controller.

The use of low-permeability materials for the drums 15 and/or 16 may result in a lighter MR fluid clutch apparatus 10 in comparison to high-permeability drums 15 and/or 16 of the same diameter. In some conditions, it may be possible to reduce the inertia of the output drum 16 more than four times by using a light low-permeability material (i.e., plastic). This may have the effect of doubling the bandwidth of the MR fluid clutch apparatus 10, in a particular set up. Consequently, the performance of the MR fluid clutch apparatus 10 of the present disclosure may be improved in terms of bandwidth (i.e., response frequency) via a reduced inertia over MR fluid clutch apparatuses 10 without low-permeability materials for the drums or discs. Moreover, with lower inertial and momentum forces due to the weight reduction in the drums 15 and/or 16, the durability of the MR fluid 19 may be increased, as there may result reduced slippage. There may also be an advantage (e.g., increase torque, increase MRF durability and decrease drum wear) of having a boundary layer of MR fluid 19 "stick" or adhere to the drum surfaces. Increased adhesion may limit the slip between the fluid boundary layer and the adjacent drum surface. Having a limited slip may distribute the shearing motion in the MR fluid 19 itself, between MR fluid particles, and not between the drum surface and the MR fluid particles. The boundary layer speed in relation to the drum 15/16 may also be decreased. The surface of the drums 15/16 may be irregular or with a high roughness, due to liberties from manufacturing, and this may be used to increase the adhesion of the MR fluid 19 on the drum surface. The surface of the low-permeability material may also be coated with a thin film of high-permeability material in order to increase the propensity of the MR fluid 19 to stick to the drum material.

In comparison to MR fluid clutch apparatuses with drums made solely of high-permeability materials, the MR fluid clutch apparatus 10 of the present disclosure may have an increased torque to inertia ratio resulting from the lighter drums. A higher torque to inertia ratio may improve controllability (higher bandwidth). However, using a low-permeability material for the drums will decrease the ability of the drums to support and transmit the magnetic flux and therefore, for a given design and coil current, the amount of magnetic flux in the MR fluid 19 may be reduced. If the magnetic circuit of the MR fluid clutch apparatus 10 reaches saturation, this may result in a decrease in the torque to weight ratio with the MR fluid clutch apparatus 10. The torque to weight ratio may be maintained high, notably by keeping the thickness of the low-permeability material relative low. The torque to volume ratio of the MR fluid clutch apparatus 10 may also be decreased in comparison to conventional MR fluid clutch apparatuses because a larger coil for the electromagnet unit 18 may be required to saturate the MR fluid 19. This ratio may also be controlled by keeping the thickness of the low-permeability material as small as possible.

As shown in the embodiments of FIGS. 2-4, by making some or all of the drums 15 and/or 16 in a low-permeability material, parts may be combined together, such as the input drum support 13 with input drums 15, and/or the output drum support 17 with output drums 16. Combining parts may reduce the parts counts and the cost.

Figure 5:
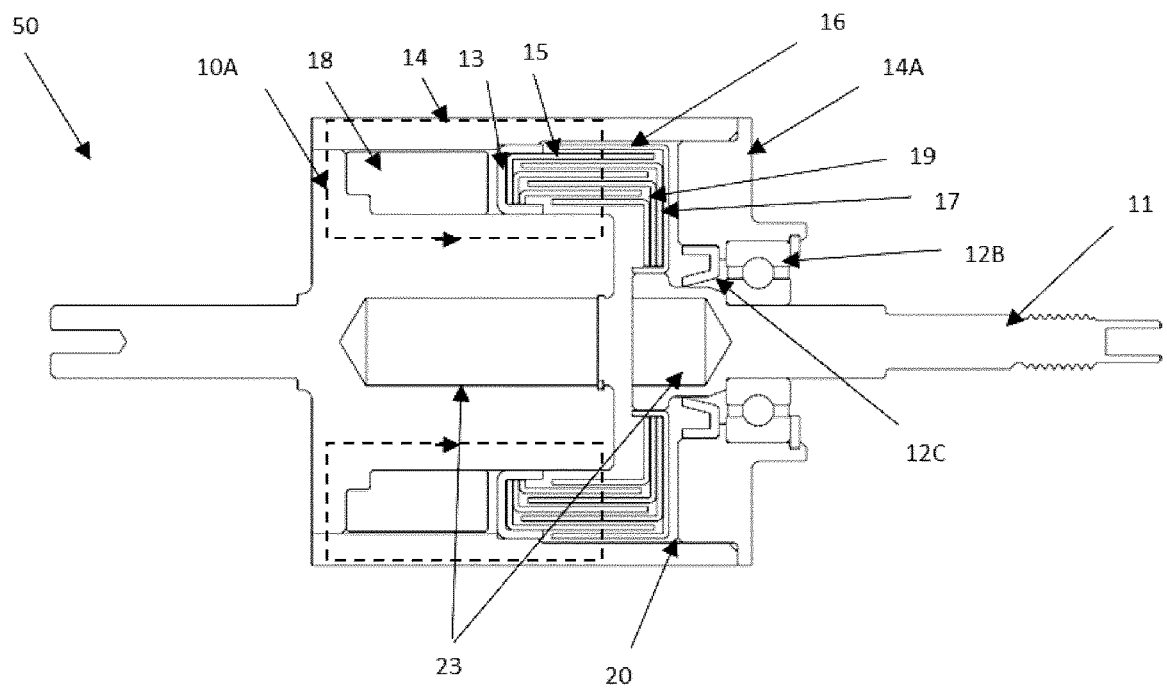
FIG. 5 a sectioned schematic view of the MR fluid brake apparatus, in accordance with a yet another embodiment.

In the embodiment of FIG. 5, the MR fluid brake apparatus 50 is similar to the MR fluid clutch apparatus 10 of FIG. 2, whereby like reference numerals represent like elements. The MR fluid brake apparatus 50 may also be referred to as a MR fluid clutch apparatus, with a static member. In FIG. 5, the driving member 12 and the stator 10A are now represented as a non-moving part in order to act as a brake when stator 10A is mounted on a chassis (not illustrated) or like structure. Stated differently, there is no stator 10A or no driving member 12 in FIG. 5. Torque generation of the MR fluid brake apparatus 50 is similar to the one of MR fluid clutch apparatus 10 of FIGS. 1 to 4, with the driven member 11 rotating because of an output it may receive via its shaft, and exteriorly from the MR fluid clutch apparatus 50. The electromagnet unit 18 is actuated to cause a braking effect on the driven member 11, by the static driving member 12/stator 10A. The MR fluid brake apparatus 50 may have the cup configuration shown in FIGS. 4 and 6, or the configurations shown in FIGS. 2 and 3.

FIG. 7 is a MR fluid brake apparatus 70 similar to MR fluid brake apparatus 50 of FIG. 5 but with the difference that it is using discs 71 and 72 instead of drums. A similar configuration of discs 71 and 72 may be present in the embodiments of FIGS. 2-4, with the discs 71 and/or 72. The discs 71 and/or 72 may be made in the low permeability material. In an embodiment, the support for the discs 71 and/or 72, whether a shaft or housing, are stiffer than the discs 71 and 72.

What is claimed is:

1. A magnetorheological fluid clutch apparatus comprising:
    at least one input adapted to be coupled to a torque input, the input having at least one input shear surface;
    an output rotatably mounted about the input for rotating about a common axis with the input, the output having at least one output shear surface, the input shear surface and the output shear surface separated by at least one annular space;
    magnetorheological fluid in the at least one annular space, the magnetorheological fluid configured to generate a variable amount of torque transmission between the at least one input and the output when subjected to a magnetic field; and
    at least one electromagnet configured to deliver a magnetic field through the magnetorheological fluid, the electromagnet configured to vary the strength of the magnetic field;
    whereby actuation of the electromagnet results in torque transmission from the input to the output,
    wherein the at least one output shear surface is made of a low-permeability material such that a circuit of the magnetic field passes through the low-permeability material.

2. The magnetorheological fluid clutch apparatus according to claim 1, wherein the output includes at least one output drum made with the low-permeability material, the at least one output drum defining the at least one output shear surface.

3. The magnetorheological fluid clutch apparatus according to claim 2, wherein the at least one output drum has a thickness ranging 0.05 mm and 1.00 mm, inclusively.

4. The magnetorheological fluid clutch apparatus according to claim 2, including a plurality of the output drum in a concentric arrangement about the common axis.

5. The magnetorheological fluid clutch apparatus according to claim 4, wherein the output drums are defined by concentric tubular body portions connected to a common radial wall.

6. The magnetorheological fluid clutch apparatus according to claim 5, wherein the common radial wall is made from a low-permeability material.

7. The magnetorheological fluid clutch apparatus according to claim 5, wherein the concentric tubular body portions and the radial wall are a monolithic piece.

8. The magnetorheological fluid clutch apparatus according to claim 5, wherein the output drums are cups inserted in one another.

9. The magnetorheological fluid clutch apparatus according to claim 5, wherein the input drums are cups inserted in one another.

10. The magnetorheological fluid clutch apparatus according to claim 1, wherein the at least one input includes at least one input drum made with the low-permeability material, the at least one input drum defining the at least one input shear surface.

11. The magnetorheological fluid clutch apparatus according to claim 10, wherein the at least input drum has a thickness ranging 0.05 mm and 1.00 mm, inclusively.

12. The magnetorheological fluid clutch apparatus according to claim 10, including a plurality of the input drum in a concentric arrangement about the common axis.

13. The magnetorheological fluid clutch apparatus according to claim 12, wherein the input drums are defined by concentric tubular body portions connected to a common radial wall.

14. The magnetorheological fluid clutch apparatus according to claim 13, wherein the common radial wall is made from a low-permeability material.

15. The magnetorheological fluid clutch apparatus according to claim 13, wherein the concentric tubular body portions and the radial wall are a monolithic piece.

16. The magnetorheological fluid clutch apparatus according to claim 1, wherein the annular space between the input shear surface and the output shear surface shear has a width of 0.25 mm +/−0.05 mm.

17. The magnetorheological fluid clutch apparatus according to claim 1, wherein the low-permeability material is a plastic or aluminum.

18. The magnetorheological fluid clutch apparatus according to claim 17, wherein the plastic or aluminum is doped with metallic particles.

19. The magnetorheological fluid clutch apparatus according to claim 1, wherein the low-permeability material has a permeability of at most $1.0 \times 10^{-4}$ H/m.

20. The magnetorheological fluid clutch apparatus according to claim 1, wherein all of the at least one output shear surface is made in the low-permeability material.

21. The magnetorheological fluid clutch apparatus according to claim 1, wherein all of the at least one input shear surface is made in the low-permeability material.

* * * * *